(12) United States Patent
Meaux et al.

(10) Patent No.: US 11,897,586 B2
(45) Date of Patent: Feb. 13, 2024

(54) SURFACE VESSEL FUELING SYSTEMS AND METHODS

(71) Applicant: L3Harris Technologies, Inc., Melbourne, FL (US)

(72) Inventors: Jeremy S. Meaux, Maurice, LA (US); Isaac D. Kremers, Grand Rapids, MI (US); Nicholas B. Jones, Lafayette, LA (US); Mark E. Cooper, Norfolk, VA (US); Quinton P. Elliott, Sunset, LA (US); Andrew T. Pidduck, Broussard, LA (US); Joel C. Jurisich, Lafayette, LA (US); Robert L. Henry, Youngsville, LA (US); Garret Marzolf, Tomball, TX (US)

(73) Assignee: L3Harris Technologies, Inc., Melbourne, FL (US)

( * ) Notice: Subject to any disclaimer, the term of this patent is extended or adjusted under 35 U.S.C. 154(b) by 229 days.

(21) Appl. No.: 17/682,671

(22) Filed: Feb. 28, 2022

(65) Prior Publication Data
US 2023/0029515 A1    Feb. 2, 2023

Related U.S. Application Data

(60) Provisional application No. 63/227,818, filed on Jul. 30, 2021.

(51) Int. Cl.
| | |
|---|---|
| B63B 27/08 | (2006.01) |
| B63B 27/30 | (2006.01) |
| B66D 1/26 | (2006.01) |
| B63B 27/24 | (2006.01) |
| B66D 1/60 | (2006.01) |

(52) U.S. Cl.
CPC .............. B63B 27/30 (2013.01); B63B 27/08 (2013.01); B63B 27/24 (2013.01); B66D 1/26 (2013.01); B66D 1/60 (2013.01)

(58) Field of Classification Search
CPC ......... B63B 27/30; B63B 27/08; B63B 27/24; B66D 1/60
See application file for complete search history.

(56) References Cited

U.S. PATENT DOCUMENTS

| | | | |
|---|---|---|---|
| 2003/0172991 A1* | 9/2003 | de Baan ................. | B63B 27/24 141/382 |
| 2010/0226723 A1* | 9/2010 | Chouest ................. | B63B 27/24 440/67 |
| 2019/0301252 A1* | 10/2019 | Bay ........................ | E21B 19/24 |

* cited by examiner

*Primary Examiner* — Jason K Niesz
(74) *Attorney, Agent, or Firm* — Edell, Shapiro & Finnan, LLC

(57) ABSTRACT

A system that includes a first winch assembly having a first structure on which a fuel hose is configured to be spooled and unspooled, the first structure having a first rotational axis. The system also includes a second winch assembly located rearward of the first winch assembly, the second winch assembly includes a second structure on which a messenger line is configured to be spooled and unspooled, the second structure having a second rotational axis and being rotatable between first and second rotational positions. Upon the second structure being in the first rotational position the second rotational axis is non-orthogonal to the first rotational axis. Upon the second structure being in the second rotational position, the second rotational axis is orthogonal to the first rotational axis. The second structure including an axial through opening through which the fuel line is configured to pass when the second structure is in the second rotational position.

20 Claims, 23 Drawing Sheets

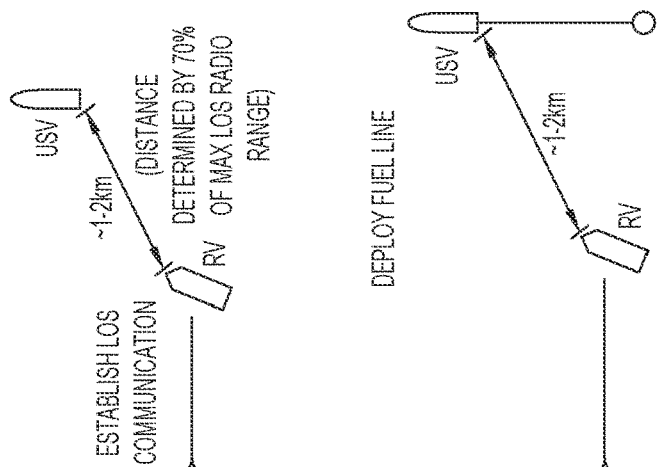

| # | LIGHT SEQUENCE | VESSEL | DESCRIPTION | PORTABLE C2 ACTIONS |
|---|---|---|---|---|
| 1 | ○○○ | RV | APPROACH USV STERN AND MAINTAIN SEPARATION OF 1-2 km RANGE | |
| 2 | | RV | NOTIFY SHORT RANGE LOS COMMUNICATIONS ESTABLISHED | NOTIFY, READY |
| 3 | | RV | SET REFUELING OPERATIONS | INITIATE ACTION |
| 4 | ○○✹ | USV | POWER ON REFUELING MODULE AND PERFORMS SELF-TEST | |
| 5 | | USV | NOTIFY RV SELF-TEST PASS, & REFUELING CONDITION SET | NOTIFY, READY |
| 6 | | RV | SEND COURSE AND SPEED REQUEST TO USV FOR APPROVAL | INITIATE ACTION |
| 7 | | USV | RERIFY REQUEST COURSE AND SPEED WITH CA | |
| 8 | | USV | NOTIFY COURSE AND SPEED APPROVED | NOTIFY, READY |
| 9 | | RV | ACTIVATE APPROVED USV COURSE AND SPEED | INITIATE ACTION |
| 10 | ○○✹ | USV | MANEUVER TO APPROVED COURSE AND SPEED & LOCK OUT CA/PP FROM ACTING | |
| 11 | ○○⊕ | USV | NOTIFY ON COURSE AND SPEED, AND READY FOR FUEL LINE DEPLOYMENT | NOTIFY, READY |
| 12 | ○○✹ | RV | START FUEL LINE DEPLOYMENT | INITIATE ACTION |
| 13 | | RV | DEPLOY FUEL LINE TO 400' (350' FUEL LINE, 50' CATCH LINE) | |
| 14 | ●○○ | USV | NOTIFY FUEL LINE FULLY DEPLOYED, CATCH LINE READY FOR RV PICKUP | NOTIFY, READY |

FIG.4A

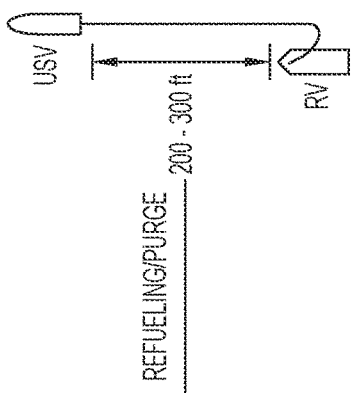

| # | LIGHT SEQUENCE | VESSEL | DESCRIPTION | PORTABLE C2 ACTIONS |
|---|---|---|---|---|
| 15 | | RV | APPROACH USV FUEL CATCH LINE AND BRING ONBOARD | |
| 16 | | RV | ATTACH HOSE TO RV DECK AND SET FUELING MODE | INITIATE ACTION |
| 17 | | USV | MAINTAINS 200 ft.-300 ft. STERN TO BOW SEPARATION VIA SPEED ADJUSTMENTS | |
| 18 | | USV | NOTIFY READY TO COMMENCE REFUELING OPERATIONS | NOTIFY, READY |
| 19 | | RV | BEGIN FUEL DELIVERY | INITIATE ACTION |
| 20 | | USV | MONITOR FUEL LEVEL, AND SHUTOFF FUEL WHEN AT CAPACITY | |
| 21 | | USV | PREPARE TO PURGE FUEL FROM LINE | NOTIFY, READY |
| 22 | | RV | BEGIN PURGING FUEL LINE | INITIATE ACTION |
| 23 | | USV | INTAKE REMAINING FUEL IN LINE, MONITOR FOR PURGE AIR | |
| 24 | | USV | NOTIFY PURGE COMPLETE | NOTIFY, READY |

FIG.4B

| 1 | 2 | 3 | 4 |
|---|---|---|---|
| USV / RV | USV / RV | USV / RV | USV / RV |
| USV TURN 20 DEGREES AWAY FROM RV | USV MAINTAINS COURSE/SPEED | USV MAINTAINS COURSE/SPEED | USV INCREASE SPEED |
| RV MAINTAINS COURSE/SPEED | RV TURN 20 DEGREES AWAY FROM USV | RV REDUCE SPEED | RV MAINTAINS COURSE/SPEED |

BREAKAWAY ACTIONS

FIG.5

| CODE | DEFINITION |
|---|---|
| ○○○ | REFUELING CONDITION INACTIVE |
| ○○⊖ | REFUELING CONDITION SET, DO NOT APPROACH |
| ○○✹ | VESSEL MANEUVERING, DO NOT APPROACH |
| ○●○ | READY, FULLY RECOVERED POSITION |
| ○✹○ | ACTIVELY DEPLOYING/RECOVERING |
| ◎○○ | FUEL LINE FULLY DEPLOYED AND CLEAR OF REFUELING VESSEL DECK |
| ◎●○ | FUEL LINE ATTACHED TO REFUELING VESSEL, NO FUEL FLOWING/PURGE IN PROGRESS |
| ◎✹○ | FUEL FLOWING/PURGE IN PROGRESS |
| ◎●✹ | FUEL HOSE CONTAINS NO FUEL |

✹ FLASHING RED WHILE GREEN AND/OR YELLOW LIGHTS ARE ILLUMINATED MANEUVERING/CA CONFLICT CHECK LOS C2 STATION FOR COA

⊖ SOLID RED WHILE GREEN AND/OR YELLOW LIGHTS ARE ILLUMINATED IMMEDIATELY STOP REFUELING, CAP AND CLEAR LINE OF REFUELING VESSEL DECK

✹ FLASHING GREEN AND YELLOW LIGHTS TOGETHER REFUELING SYSTEM FAULT CHECK C2 STATION TO DETERMINE COA

FIG. 6

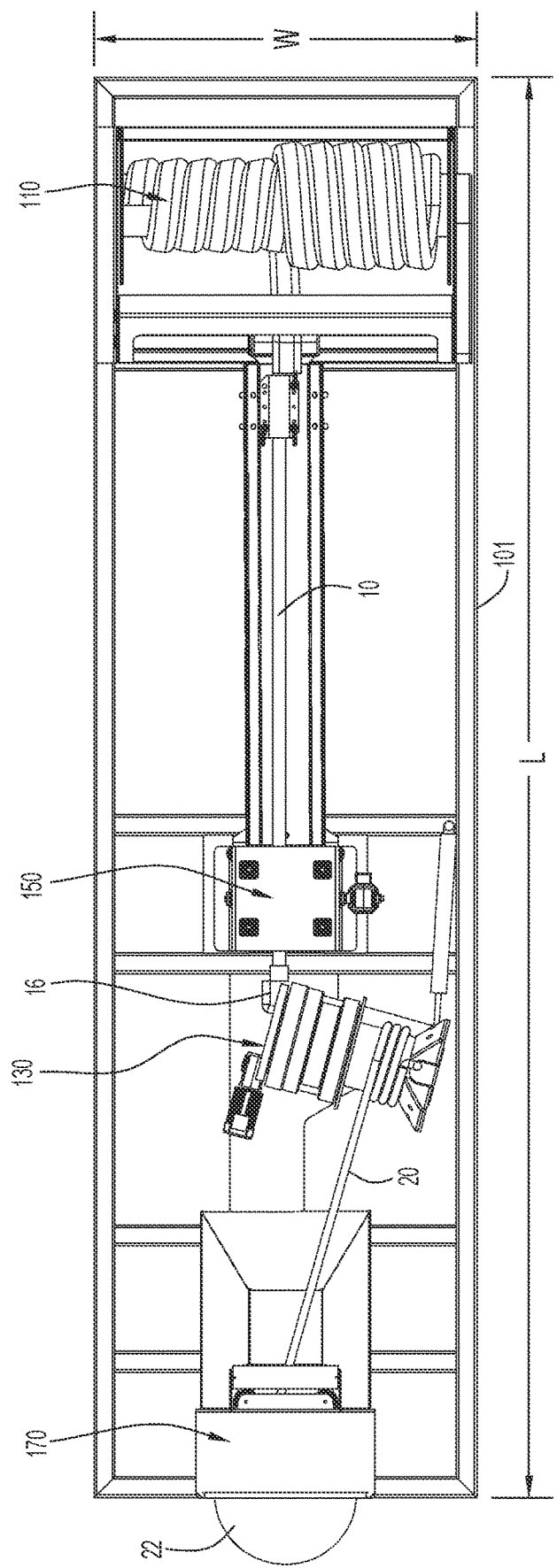

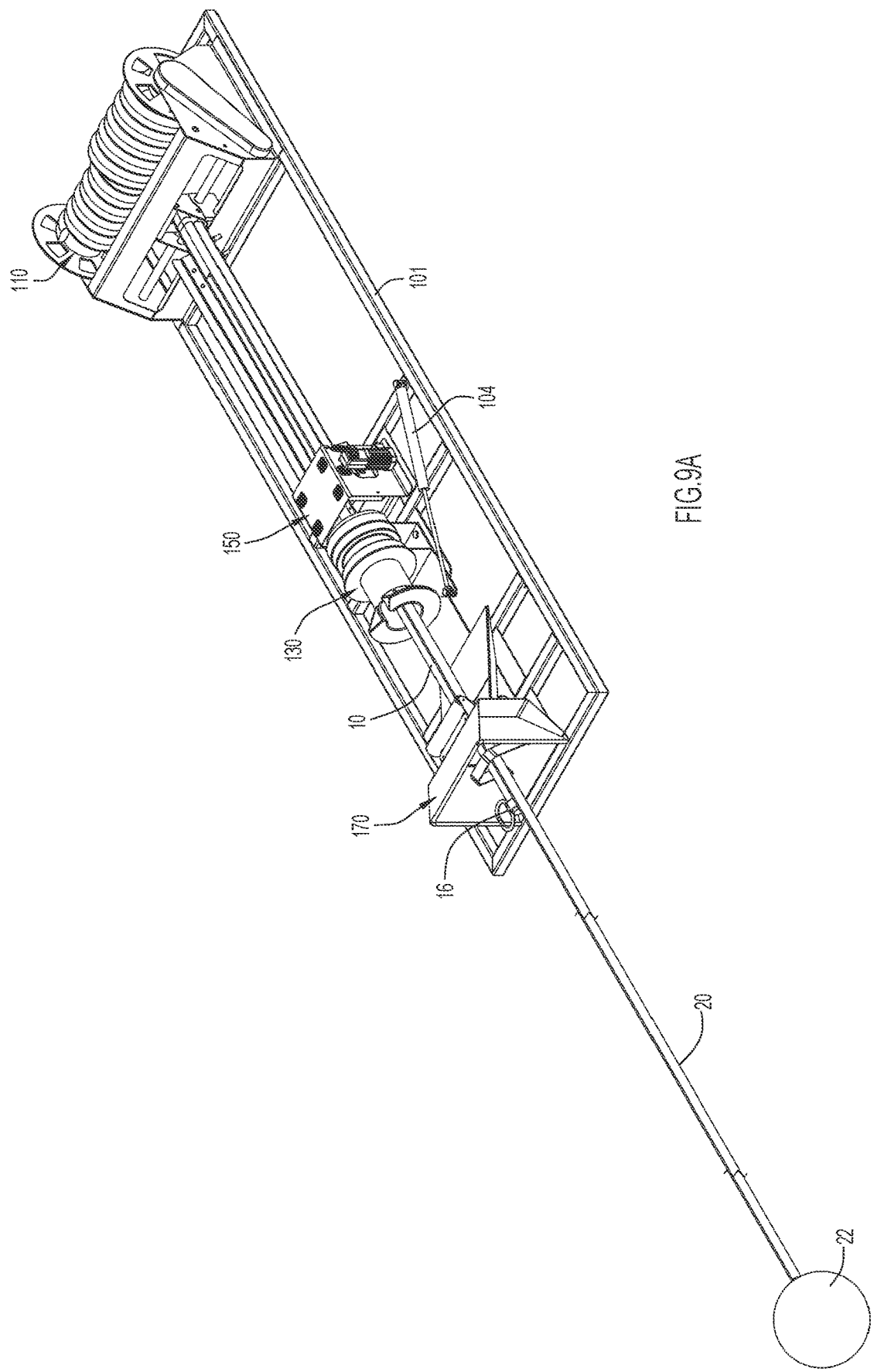

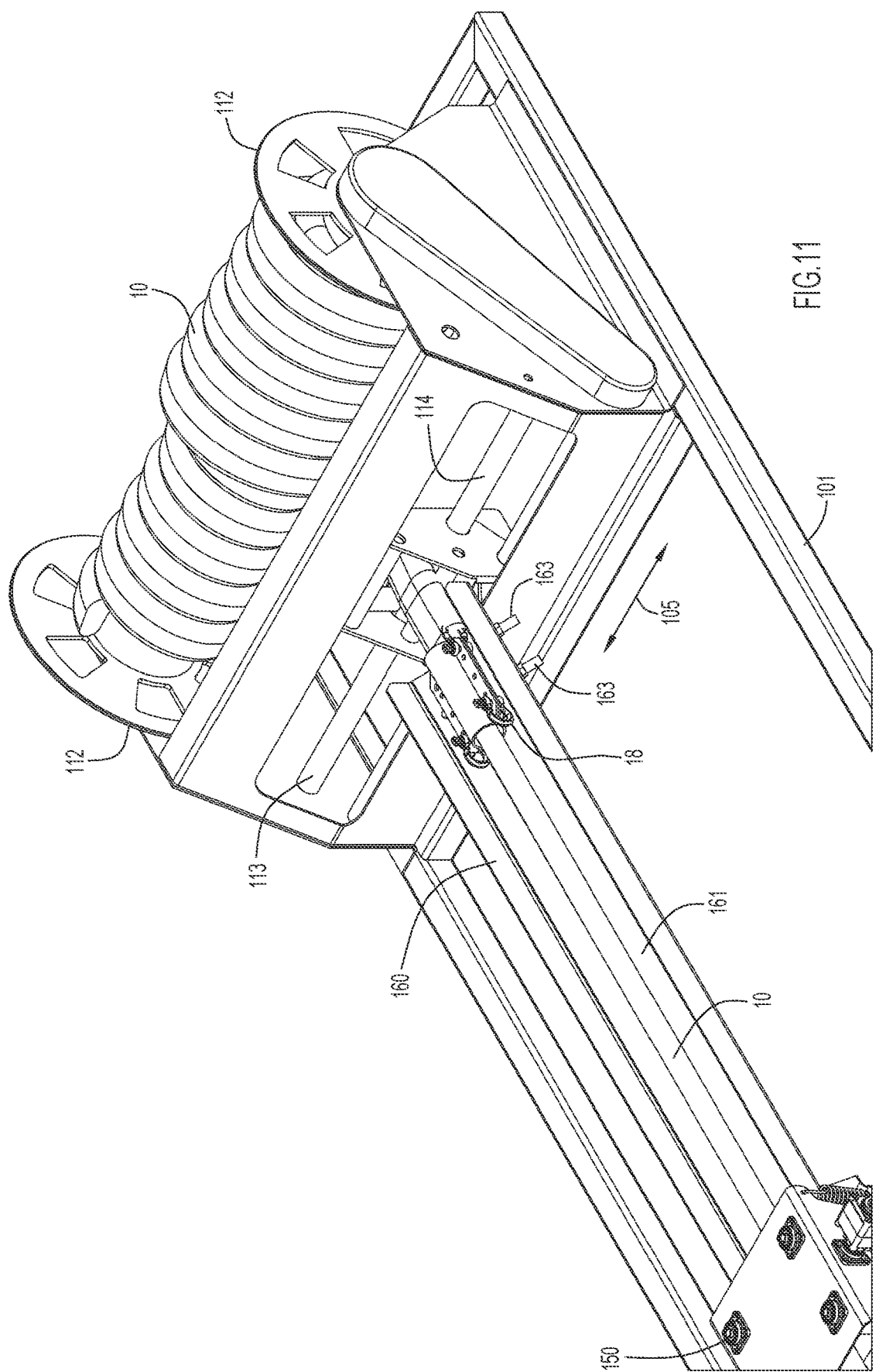

SECTION A-A

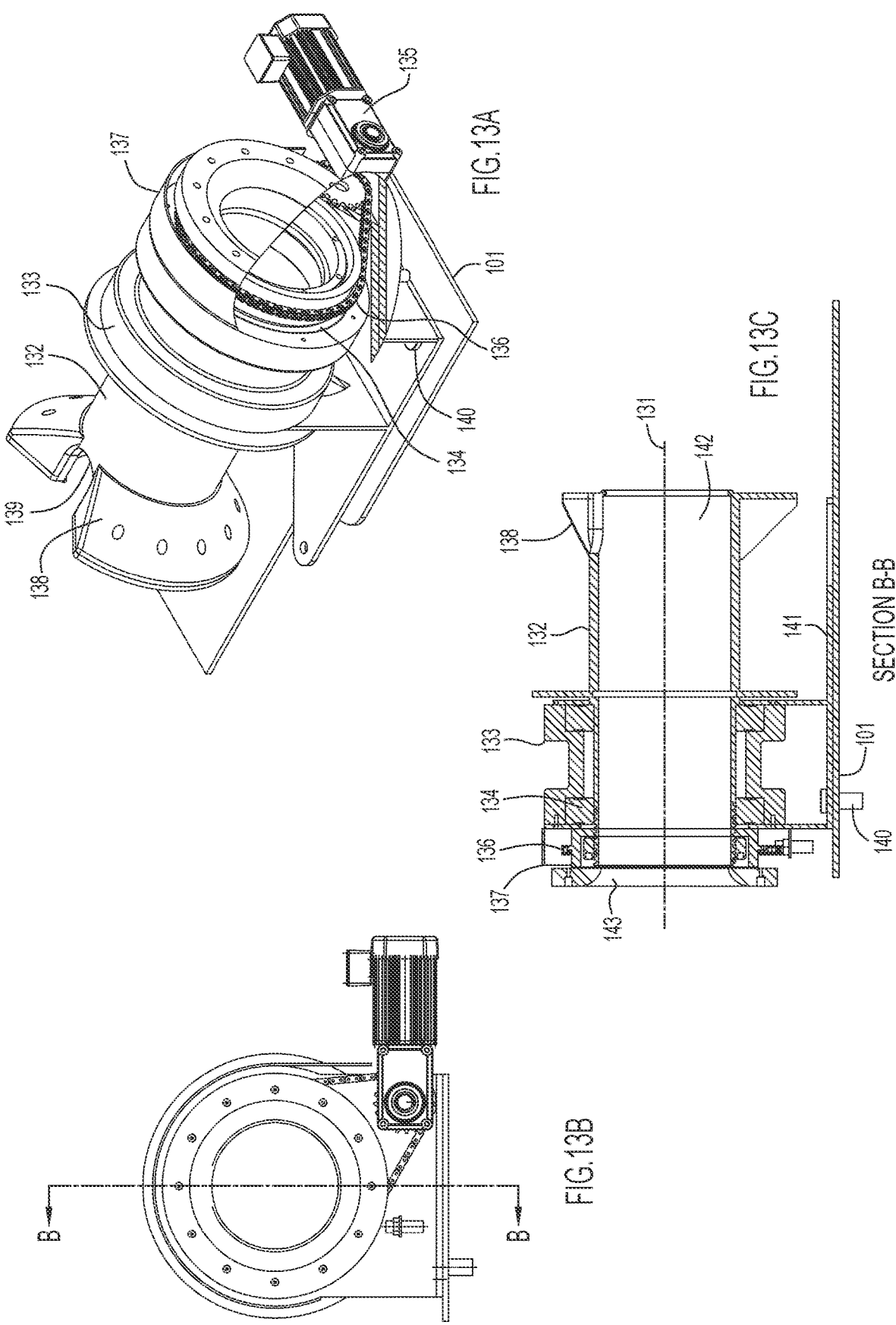

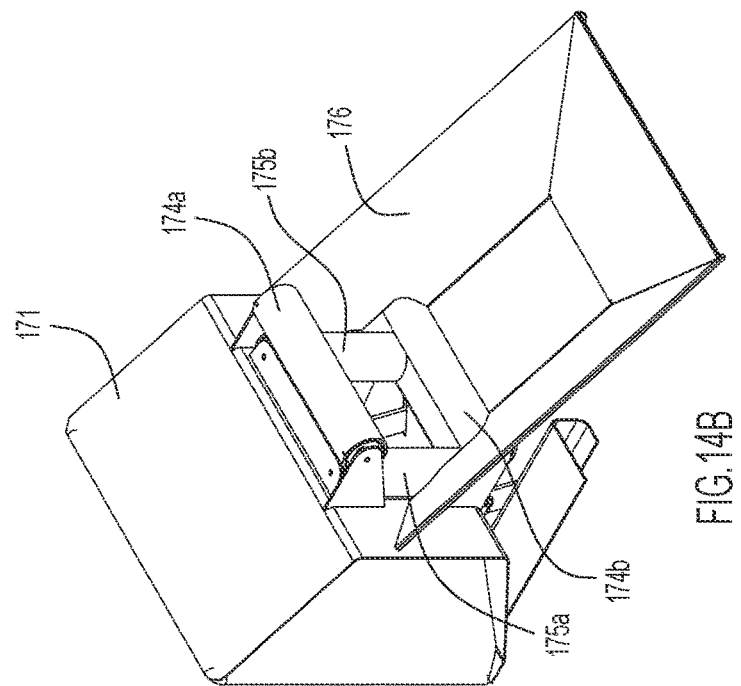
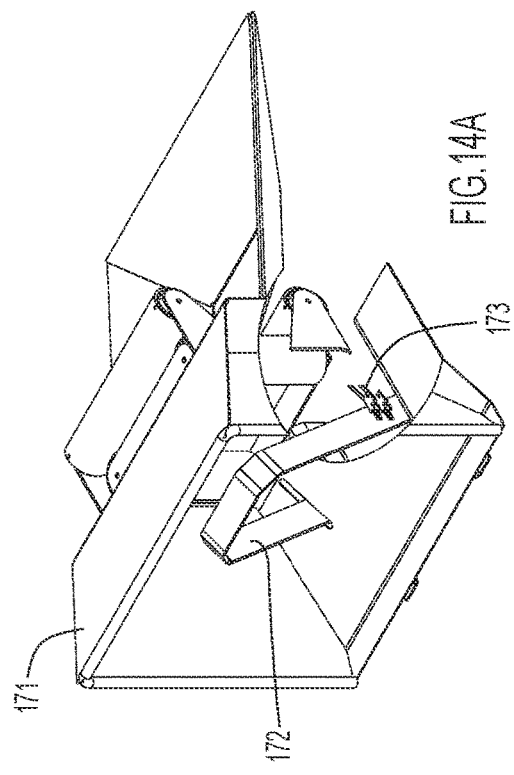
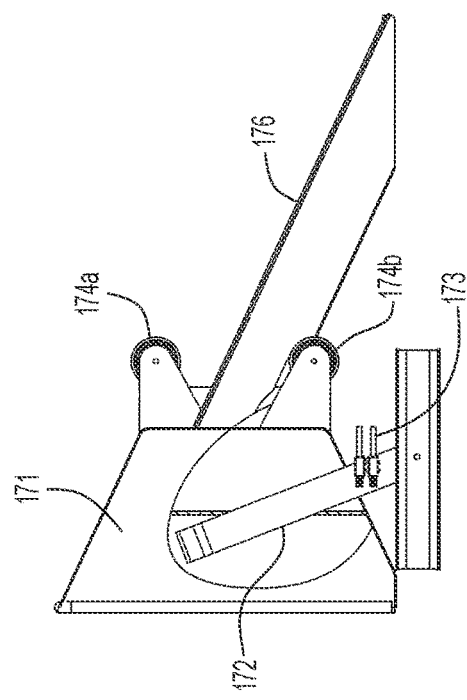
FIG.14A
FIG.14B
FIG.14C

SURFACE VESSEL FUELING SYSTEMS AND METHODS

CROSS-REFERENCE TO RELATED APPLICATIONS

This application claims the benefit and priority to provisional patent application No. 63/227,818 filed on Jul. 30, 2021.

FIELD

The present invention relates to methods and systems for fueling underway surfaces vessels.

BACKGROUND

In order to carry out a mission effectively, ships and other vessels must be capable of remaining at sea for prolonged periods of time. For this reason, underway replenishment methods have been employed to transfer goods from a supply/host ship to a receiving ship. Among the types of goods that are transferred is fuel that is used to power the receiving ship.

Refueling of unmanned surface vessels is complicated for reason that no one is onboard to receive a refueling line from a host ship/refueling vessel. As a result, refueling typically requires mobilizing a crew onboard the unmanned vessel via a small transfer vessel. Another method is to maneuver the unmanned vessel alongside the refueling vessel to deploy a crew onboard or to make a remote stab with a pole to connect the fuel hose to the unmanned vessel. A problem with each of these approaches is that they are only available in fair weather sea states as risks to personnel and hardware increase dramatically with degraded weather conditions.

SUMMARY

Disclosed are systems and methods for refueling seagoing surface vessels. In the discussion that follows, as an example, the receiving ship is an unmanned surface vessel (USV). It is appreciated, however, that the systems and methods disclosed herein may be applied to refueling any type of surface vessel.

According to one method, the underway replenishment of fuel takes place with the USV located forward of the refueling vessel (RV). As the USV and RV travel in a forward direction with the RV trailing the USV, a fuel hose is deployed from an aft part of the USV and eventually coupled to a fuel supply connection located on a forward part (e.g. bow) of the RV. When the transfer of fuel is complete, the fuel hose is disconnected from the RV and retrieved onto the USV while the RV is maintained rearward of the USV.

A fuel hose deployment and retrieval system located on an aft part of the USV is used to offload the fuel hose from the USV. According to one implementation, the offloading first includes launching a buoy and an attached messenger line into the sea using a messenger line winch assembly. Thereafter, the fuel hose, which is attached to a distal end portion of the messenger line, is offloaded into the sea using a fuel hose winch assembly located forward of the messenger line winch assembly. According to one implementation, the length of the deployed messenger line is about 50 feet and the length of the deployed fuel hose is about 300 to 400 feet.

According to one implementation, the messenger line winch and the fuel hose winch assemblies are spaced-apart and attached to a common longitudinal frame. According to one implementation, the messenger line winch assembly is configured to pivot on the frame between different angular positions whilst the fuel hose winch assembly is secured in a fixed position on the frame without the ability to pivot. In an initial ready state, prior to offloading the messenger line and fuel hose from the USV, the messenger line and fuel hose winch assemblies respectively include first and second drums onto which the messenger line and fuel hose are respectively wound. The first drum includes a first rotational axis and the second drum includes a second rotational axis. In the initial ready state, the first rotational axis is arranged non-orthogonal to the second rotational axis. According to one implementation, the first rotational axis is arranged both non-orthogonal and non-parallel to the second rotational axis when the messenger line winch is in its initial ready state. However, prior to deploying the messenger line, the messenger line winch is pivoted such that the first rotational axis is arranged substantially orthogonal to the second rotational axis in order that the fuel hose may be advanced through a hollow bore of the first drum during the offloading of the fuel hose.

As noted above, when the transfer of fuel is complete, the fuel hose is disconnected from the RV and retrieved onto the USV. This involves returning the messenger line and fuel hose into the sea and then returning them onboard the USV using the messenger line and fuel hose winch assemblies. During this retrieval process, the messenger line winch assembly is initially arranged such that the first and second rotational axes of the respective first and second drums are disposed substantially orthogonal to one another. With the messenger line and fuel hose winch assemblies arranged as such, the fuel hose winch assembly is activated to spool the fuel hose onto the second drum with the fuel hose passing through the inner bore of the first drum. When the spooling of the fuel hose is complete, thereafter, the messenger line winch is pivoted on the frame so that the first rotational axis of the first drum is non-orthogonal to the second rotational axis of the second drum. Thereafter, the messenger line winch is activated to spool the messenger line back onto the first drum.

These and other advantages and features will become evident in view of the drawings and detailed description.

BRIEF DESCRIPTION OF THE DRAWINGS

FIGS. 4A-C illustrate an underway fuel replenishment method according to one implementation.

FIG. 5 illustrates alternative breakaway actions between the unmanned surface vessel and the refueling vessel.

FIG. 6 illustrates different lighting sequences of a signal assembly located on the stern of the unmanned surface vehicle to provide situational awareness to the crew of the refueling vessel.

FIGS. 7A-C illustrate a fuel hose deployment and retrieval system in an initial ready state according to one implementation.

FIGS. 9A-B illustrate the fuel hose deployment and retrieval system of FIGS. 7A-C with the buoy and messenger line fully deployed.

FIG. 11 illustrates the fuel hose winch assembly with the fuel hose assembly fully spooled on a drum thereof.

FIG. 13A-C illustrate the messenger line winch assembly according to one implementation.

FIGS. 14A-C illustrate a messenger line buoy chute of the fuel hose deployment and retrieval system according to one implementation.

DETAILED DESCRIPTION

Figure 1:
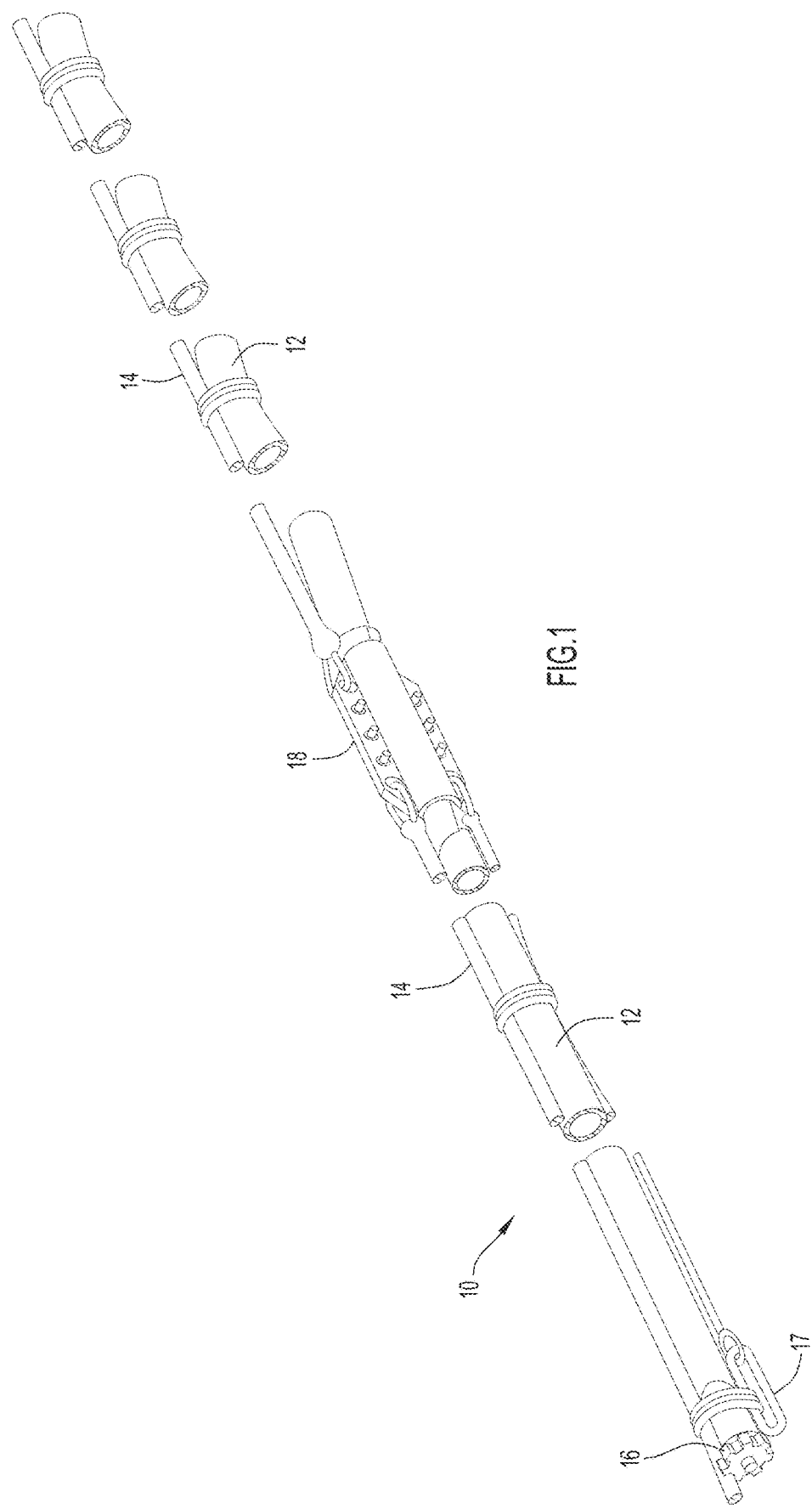
FIG. 1 illustrates a fuel hose assembly according to one implementation.
Figure 2:
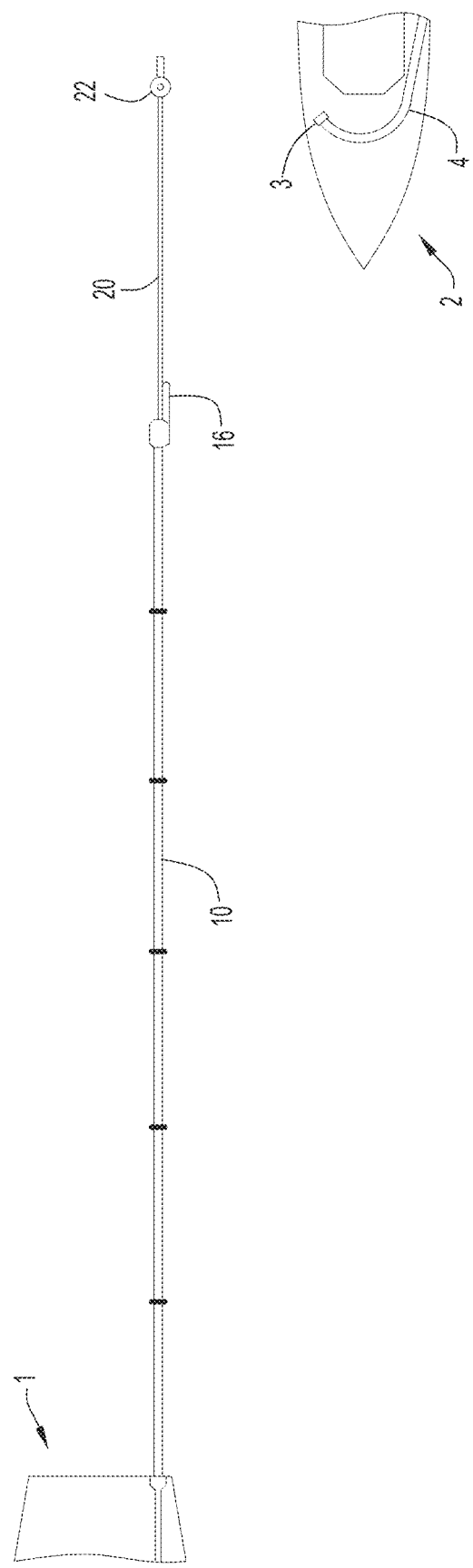
FIG. 2 shows a fuel hose assembly and messenger line deployed between an unmanned surface vessel and a refueling vessel.

FIG. 1 shows an example fuel hose assembly 10 that may be used to transfer fuel from the RV to the USV. According to one implementation, the fuel hose assembly 10 includes a fuel hose 12 and support rope 14. The support rope 14 may be coupled to the fuel hose 12 by wound filaments 15 (e.g. thread, wire, etc.), or other means at spaced-apart locations along the length of the hose. According to one implementation, a distal end of the fuel hose assembly 10 includes a quick connect/disconnect connector 16 that is configured to mate with a fuel supply connector 3 on the RV, the fuel supply connector 3 being arranged at the end of a fuel supply conduit 4 located on or in the RV. Also located at the distal end of the fuel hose assembly 10 is a ring or link 17 that facilitates a coupling of the fuel hose assembly with a messenger line 20 (see FIG. 2). The messenger line 20 may also comprise a ring or link (not shown) that is coupled to the ring or link 17 of the fuel hose assembly by a shackle or other coupling means.

According to one implementation, a clamp 18 is fitted onto a distal end portion of the fuel hose assembly 10. The use of the clamp is discussed in more detail below.

According to one implementation, the fuel hose 12 is a 2.5 inch rubber hose, the support rope 14 is a 3.0 inch nylon rope and the messenger line 20 is a 1.0 inch nylon rope.

Figure 3:
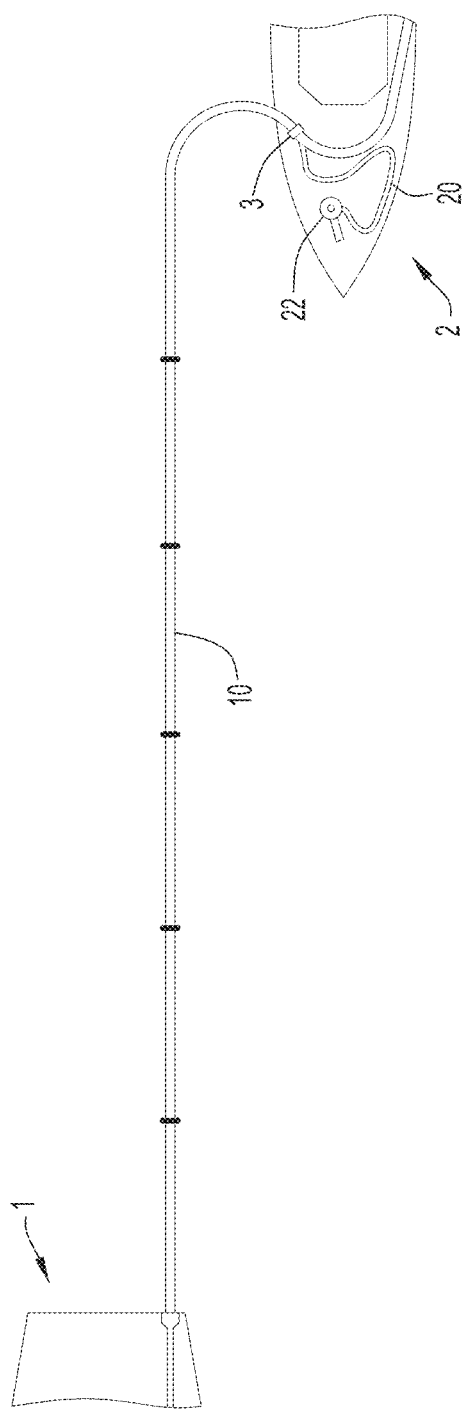
FIG. 3 shows a distal end of the fuel hose assembly coupled to a fuel supply connector onboard the refueling vessel.

As discussed above, and as shown in FIG. 2, the underway replenishment of fuel takes place with the USV 1 located forward of the RV 2. As the USV 1 and RV 2 travel in the forward movement direction, the fuel hose assembly 10 and messenger line 20 are deployed into the sea from an aft part of the USV 1. In use, the messenger line 20 is first retrieved from the sea by the crew of the RV and drawn onto a forward deck of the RV, bringing with it the distal end of the fuel hose assembly 10 that contains the quick connect/disconnect connector 16. Thereafter, the quick connect/disconnect connector 16 is coupled to a fuel supply connection 3 that may be located on a forward part (e.g. bow) of the RV as shown in FIG. 3.

When the transfer of fuel from the RV to the USV is complete, the quick connect/disconnect connector 16 of the fuel hose assembly 10 is disconnected from the fuel supply connector 3 of the RV and the fuel hose assembly 10 and messenger line 20 are returned to the sea. Thereafter, the fuel hose assembly 10 and messenger line 20 are retrieved onto the USV while the RV is maintained rearward of the USV.

Figure 4C:
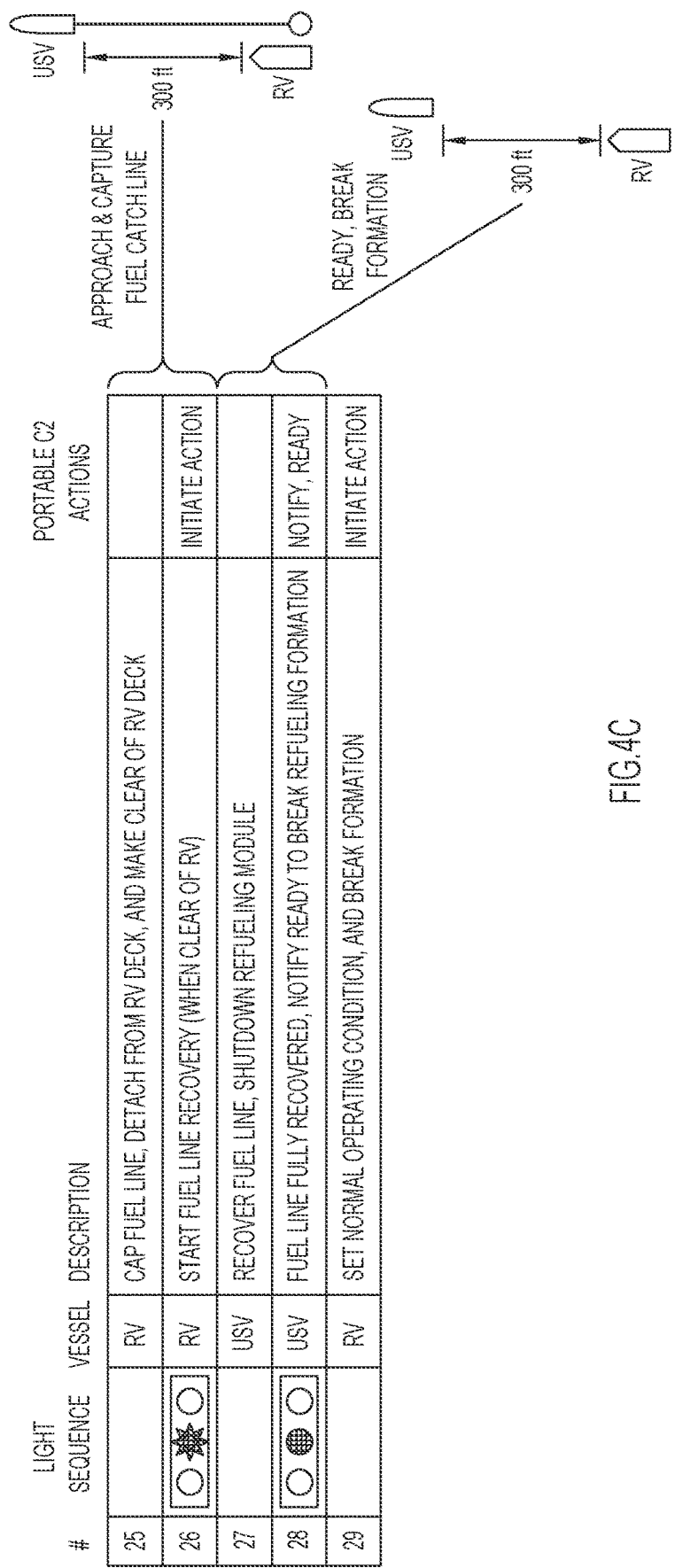

FIGS. 4A-C illustrate a more specific method of refueling an underway USV 1. In step 1, the RV 2 trails the USV 1, maintaining a separation distance of 1-2 kilometers. In step 2, short range line of sight communications with the USV is established by the RV. In step 4, a refueling module of the USV is powered on and a self-test of the refueling module is conducted. In step 5, if the self-test of the refueling module is successful, the USV notifies the RV and refueling conditions are set by the USV. Thereafter, in step 6, the RV sends a course and speed request to the USV for approval. In steps 7 and 8 if the course and speed request is deemed proper, the request is approved by the USV and the USV notifies the RV of such approval. Thereafter, in step 9 the RV activates the approved USV course and speed. In step 10, the USV maneuvers to the approved course and speed, and then in step 11 notifies the RV that it is ready for fuel line deployment. In step 12 fuel line deployment on the RV is initiated if necessary. In steps 13 and 14 the USV deploys the fuel hose assembly 10 and messenger/catch line 20 into the sea and notifies the RV that the fuel hose assembly is fully deployed and the messenger/catch line is ready for pickup. In steps 15 and 16 the RV brings the messenger/catch line 20 onboard and attaches the end of the fuel hose assembly 10 to a fuel supply connector 3 located on the RV. In steps 17 and 18 the USV makes speed adjustments to maintain a 200 to 300 foot distance between the bow of the RV and the stern of the USV and notifies the RV it is ready to commence fueling operations. Thereafter, in step 19, the RV begins fuel delivery to the USV. In step 20, the USV then monitors the fuel level in its fuel tanks and shuts off the delivery of fuel when the fuel tanks are at capacity. Thereafter, purging of the fuel hose assembly occurs as outlined in steps 21-24.

When the purging operation is complete, in step 25 the distal end of the fuel hose assembly 10 is capped and cleared from the RV deck back into the sea. Thereafter, in step 26 the supply fuel line on the deck of the RV is stowed while in step 27 the fuel hose assembly 10 and messenger line 20 are brought onboard the USV and the refueling module is shutdown. When the fuel hose assembly 10 and messenger line 20 are fully recovered, the USV notifies the RV it is ready to break from refueling formation. Thereafter, in step 29 the RV breaks formation. FIG. 5 illustrates various ways in which formation may be broken.

FIG. 6 illustrates different lighting sequences of a signal assembly that may be located on the stern of the unmanned surface vehicle to provide situational awareness to the crew of the refueling vessel. According to one implementation, the signal assembly includes a series of three lights with the left-most light illuminating green, the middle light illuminating yellow and the right-most light illuminating red. The different lighting sequences may also incorporate other forms of light, such as white light. FIGS. 4A-C and 6 show the definition of the different lighting sequences and the conditions that bring them about.

The fuel hose assembly 10 typically comprises a rubber hose 12 that is coupled to a heavy-duty support rope 14. The support rope 14 is needed so that tension applied to the fuel hose assembly 10 during refueling operations is applied to the heavy-duty support rope 14 and not directly to the hose 12 itself. Without the use of the support rope 14, the hose 12 would easily fail (e.g. snap/break) due to stresses imposed on it by its weight when filled with fuel and by tension applied to the hose while being transferred between the USV and RV. Because each of the fuel hose 12 and support rope 14 typically have a diameter between 2 to 3 inches, the resultant fuel hose assembly 10 is both heavy and bulky, especially when compared to the size and weight of the messenger line 20.

FIGS. 7A-14C depict a fuel hose deployment and retrieval system 100 that is adapted for use on an aft part of the USV 1. The system 100 is used to offload the fuel hose assembly 10 and messenger line 20 from the USV and to thereafter retrieve them. The system 100 includes a first winch 110 and a second winch 130 that are respectively configured to spool out and spool in the fuel hose assembly 10 and messenger line 20, the second winch being located rearward of the first winch. (Note that in FIG. 7A, arrow 102 points in the rearward direction and arrow 103 points in the forward direction.) Each of the drums of the first and second winches 110 and 130 respectively has a rotational axis 111 and 131. As will be discussed in more detail below, the second winch 130 is configured to pivot on the frame 101 between a first rotational position as shown in FIGS. 7A-C and 10A-C and a second rotational position as shown in FIGS. 8A-C and 9A-B. Movement of the second winch 130 between the first and second rotational positions is facilitated by a linear actuator 104 having a first end 104a coupled to the frame 101 and a second end 104b coupled to a part of the second winch.

An advantage of using separate winches for spooling the fuel hose assembly 10 and messenger line 20, is that each of the winches can be specifically configured to accommodate the different sizes and weights of the fuel hose assembly and messenger line. For example, the second winch 130 may be significantly smaller than the first winch 110 and requires a much smaller motor (in terms of size and power) than that of the first winch. As such, each of the fuel hose assembly 10 and messenger line 20 can be more efficiently spooled off and onto the respective drums of the first and second winches. The separate spooling of the fuel hose assembly 10 and messenger line 10 also prevents them from being entangled with one another.

Positioned between the first and second winches 110 and 130 is a guide roller assembly 150 that is configured to both guide and drive the fuel hose assembly 10 in the rearward direction 102. The system also includes a messenger line buoy chute 170 located rearward of the second winch 130. According to one implementation, a longitudinal tray 160 extends between the first winch 110 and the guide roller assembly 150 to support the fuel hose assembly 10 as it is spooled off and onto the drum of the first winch. According to one implementation, the bottom 161 of the support tray 160 comprises or is coated with a material having a low coefficient of friction. According to one implementation the bottom 161 of the support tray 160 comprises a nylon strip.

Figure 7A:
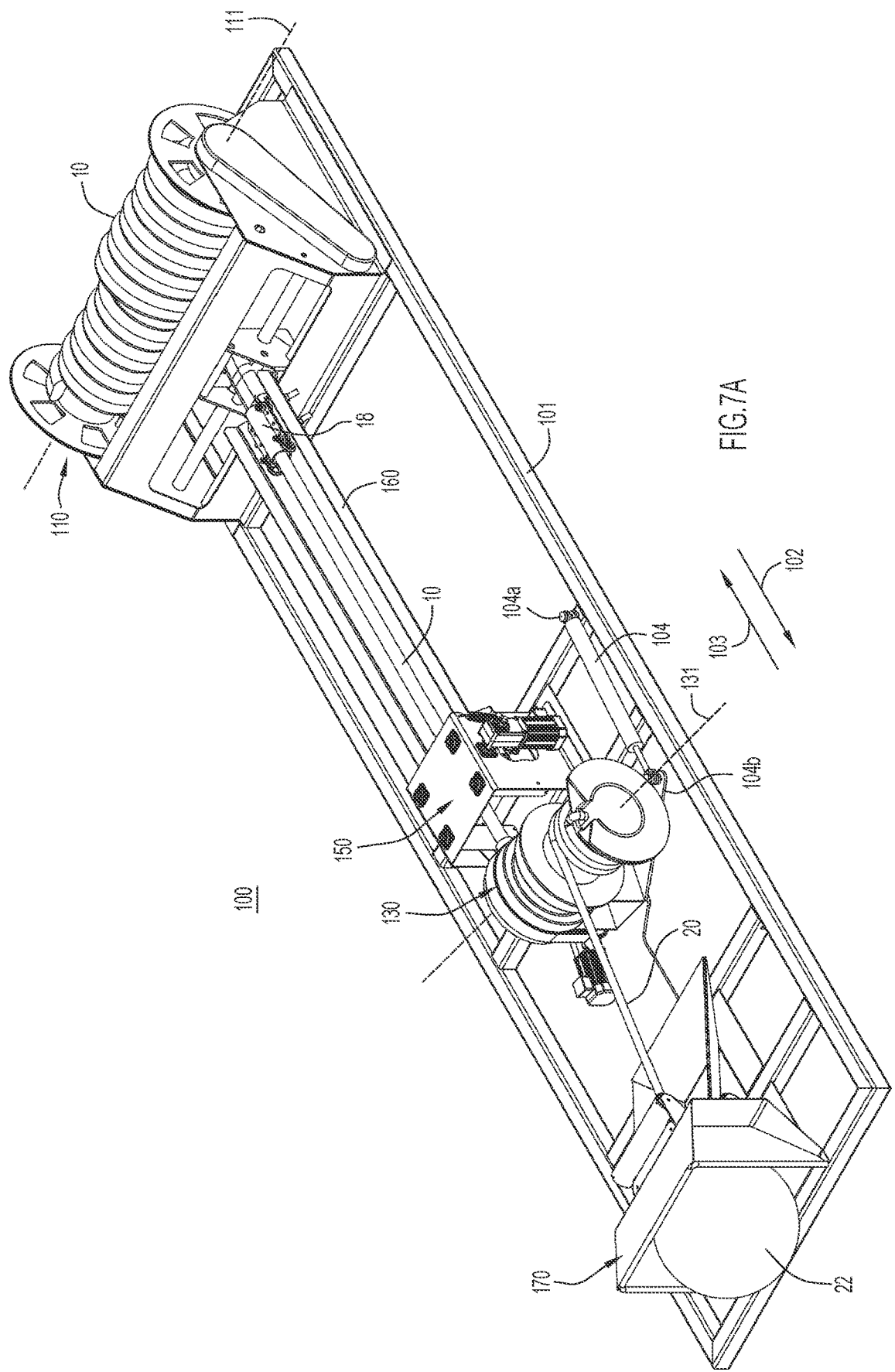
Figure 7B:
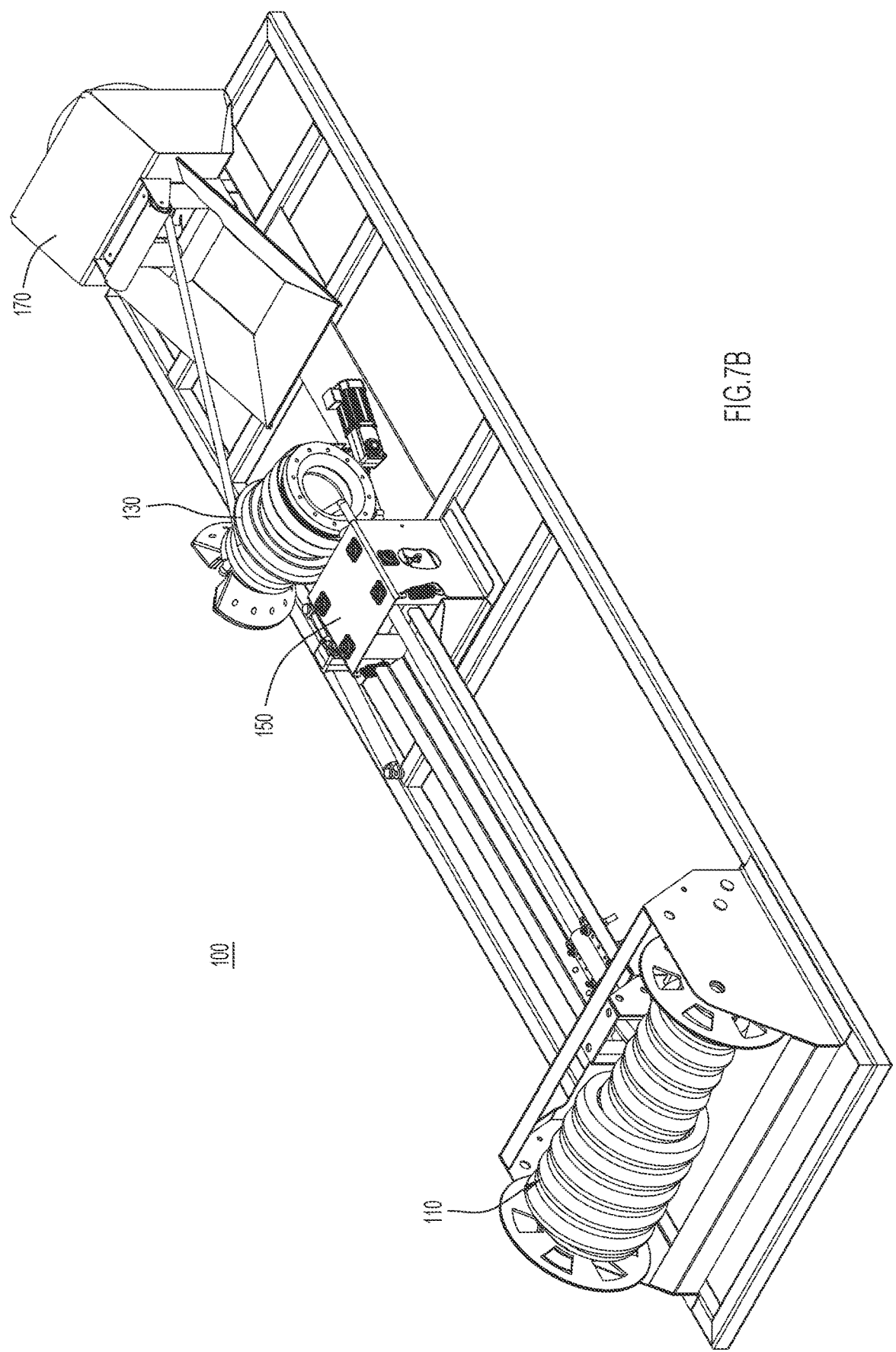

According to some implementations, the overall length L of the fuel hose deployment and retrieval system 100 is between about 20 to 25 feet and the overall width W is between about 5 to 7 feet, FIGS. 7A-C show the fuel hose deployment and retrieval system 100 in an initial ready state with the fuel hose assembly 10 spooled to its fullest extent onto the drum of the first winch 110 and with the messenger line 20 spooled to its fullest extent onto the drum of the second winch 130. When the messenger line 20 is spooled to its fullest extent onto the drum of the second winch 130, the messenger line buoy 22 is located at least partially housed inside the buoy chute 170. According to one implementation, in the initial ready state, the distal end of the fuel hose assembly 10 (which comprises the quick connect/disconnect connector 16) is disposed inside a rearward part of the guide roller assembly 150 or between the guide roller assembly 150 and the second winch 130 as best shown in FIG. 7C. According to one implementation, in the initial ready state, the hose clamp 18 is located on the support tray 160 just rearward of the outlet of the fairlead 113 of the first winch 110.

As noted above, when the messenger line winch 130 is In the initial ready state, the rotational axis 131 of drum 132 is arranged non-orthogonal to the rotational axis 111 of the first winch 110, and in some instances is arranged both non-orthogonal and non-parallel to rotational axis 111 of the first winch 110.

With reference to FIG. 11, the first winch 110 includes reels 112 between which resides a circular drum on which the fuel hose assembly 10 is wound. A motor (not shown) is operatively coupled to the drum to cause it to rotate in both a clockwise direction and a counter-clockwise direction. Inside a body of the first winch 110 resides a fairlead 113 that is configured to guide the fuel hose assembly 10 as it exits and enters the winch. According to one implementation, the fairlead 113 is capable of sliding side-to-side on a rail 114 as indicated by arrow 105. As further shown in FIG. 11, the system 100 may also include one or more position sensors 163 that are configured to detect the presence of the hose clamp 18 when it is positioned as shown in FIG. 7A and 11. As will be discussed in more detail below, the one or more position sensors 163 may be operatively associated with a control unit (not shown) that controls the operation of the motor of the first winch 110 based on the position of the hose clamp 18.

FIGS. 12A-D show various views of the guide roller assembly 150 according to one implementation. As noted above, the guide roller assembly 150 is configured to guide and pull the fuel hose assembly 10 in a rearward direction towards the second winch 130. One purpose of the guide roller assembly is to ensure the fuel hose assembly remains taught on the first winch 110, preventing it from unraveling on the winch itself.

Figure 12B:
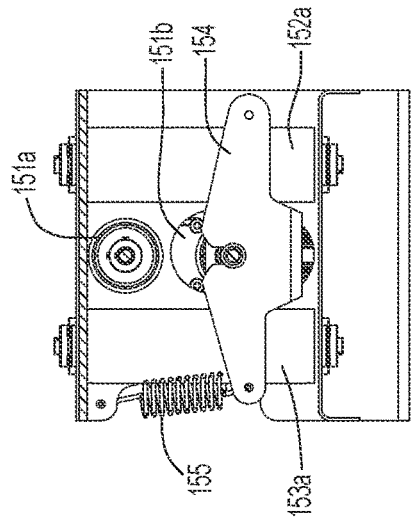
FIGS. 12A-D illustrate a guide roller assembly located between the messenger line and fuel hose winch assemblies of the fuel hose deployment and retrieval system according to one implementation.
Figure 12D:
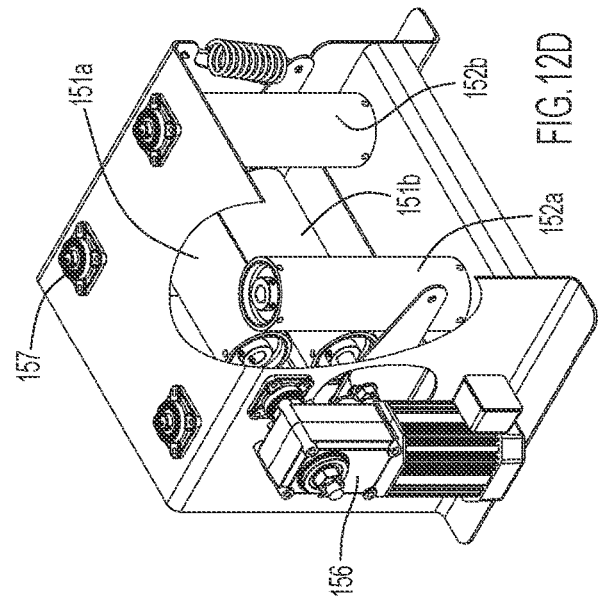
Figure 12A:
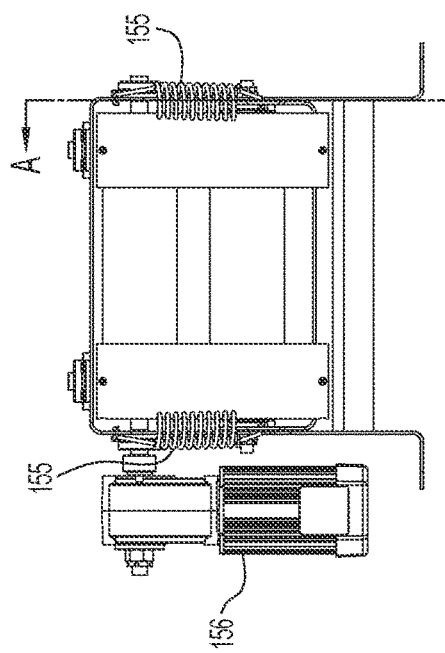
Figure 12C:
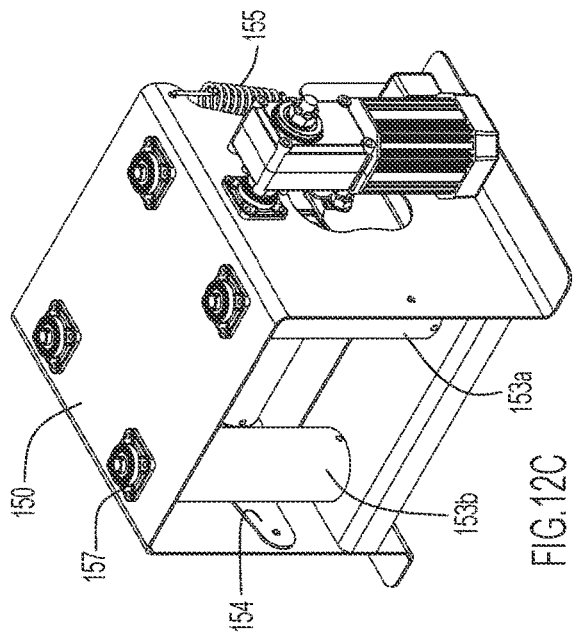

In the implementation of FIGS. 12A-D, the guide roller assembly 150 includes a housing that houses three pairs of rubber coated rollers, with each pair of rollers being arranged parallel to one another and supported at each end by a bearing 157. The first pair of rollers 151a and 151b are arranged horizontal, while the second pair of rollers 152a and 152b and the third set of rollers 153a and 153b are each arranged vertical. At least one of rollers 151a and 151b is driven in a rotating fashion by a motor 156. In the implementation shown in the figures, only the upper horizontal roller 151a is driven by the motor. In use, the fuel hose assembly 10 is arranged position between each pair of rollers. As best shown in FIG. 12B, the lower horizontal roller 151b is attached to a swing arm 154 and is moveable upward and downward with respect to the upper horizontal roller 151a. Springs 155 having a first end coupled to the swing arm 154 and a second end coupled to the housing of the guide roller assembly cause the lower horizontal roller 151b to be continuously urged towards the upper horizontal roller 151a. This enables the fuel hose assembly 10 to be firmly grasped between the upper and lower horizontal rollers 151a and 151b as the upper horizontal roller 151a rotates to drive the fuel hose assembly in a rearward direction towards the second winch 130.

FIGS. 13A-C show various views of the second winch assembly 130 according to one implementation. The second winch 130 includes a rotatable drum 132 on which the messenger line 20 may be wound and unwound. Coupled to the drum 132 is a bearing hub 133 having disposed therein bearings 134 that facilitate a rotating of the drum about its rotational axis 131. An electric motor 135 is operatively coupled to the drum 132 via a chain drive 136. Although not shown in the figures, the second winch may include a proximity switch to count the chain links as they pass across the switch. Use of the proximity switch allows the rotational position of the drum 132 to be monitored and controlled. When activated, the motor 135 causes the drum to rotate to wind the messenger line 10 onto the drum 132. As will be discussed in more detail below, the second winch also includes a release guide 138 and a retrieval notch 139 that respectively facilitate an unwinding and a winding of the messenger line 20 on the drum 132. A pivot pin 140 extending through a base 141 of the second winch and the frame 101 of the system 100 enables the second winch to rotate between first and second rotational positions as will be discussed in more detail below.

An important feature of the second winch 130 is that it possess a through opening 142 extending between first and second opposing ends of the device. As will be discussed in more detail below, the through opening 142 makes way for the fuel hose assembly 10 to pass internally through the length of the second winch 130 as it is being spooled off and onto the drum of the first winch 110. To protect the fuel hose assembly 10 from coming into contact with the chain drive 136 as it enters and exits the through opening 142, a composite guard 143 is provided adjacent and internal to the chain drive.

FIGS. 14A-C show various views of the messenger line buoy chute 170 according to one implementation. As shown in FIGS. 7A-C, when the fuel hose deployment and retrieval system 100 in the initial ready state, the buoy 22 is parked inside the buoy chute 171. As shown in FIGS. 14A and 14C, a spring loaded buoy eject arm 172 is located inside chute 171. According to one implementation, the chute assembly includes one or more position sensors 173 that are configured to detect or otherwise monitor the position of the arm 172, When the buoy 22 is parked inside the chute 171, the eject arm 172 assumes a first position where it is rotated forward in a direction toward the second winch 130. Thereafter, when the messenger line 20 is initially unwound from the drum of the second winch 130, the buoy 22 is ejected from the chute 171 by a force applied to it by the buoy eject arm 172 as the eject arm rotates rearward. When the buoy 22 is ejected from the chute 171, the eject arm 172 assumes a second position as shown in FIGS. 14A and 14C. As will be discussed in more detail below, the one or more position sensors 173 may be operatively associated with a control unit (not shown) that controls the operation of the second winch 130 based on the position of the eject arm 172.

The messenger line buoy chute 170 also comprises a pair of horizontal rollers 174a-b, a pair of vertical rollers 175a-b and a guide ramp 176 that are arranged to assist in guiding the messenger line 20 into the entrance of the chute 171. According to one implementation, the guide ramp 176 is made of or coated with a material having a low coefficient of friction.

Figure 8A:
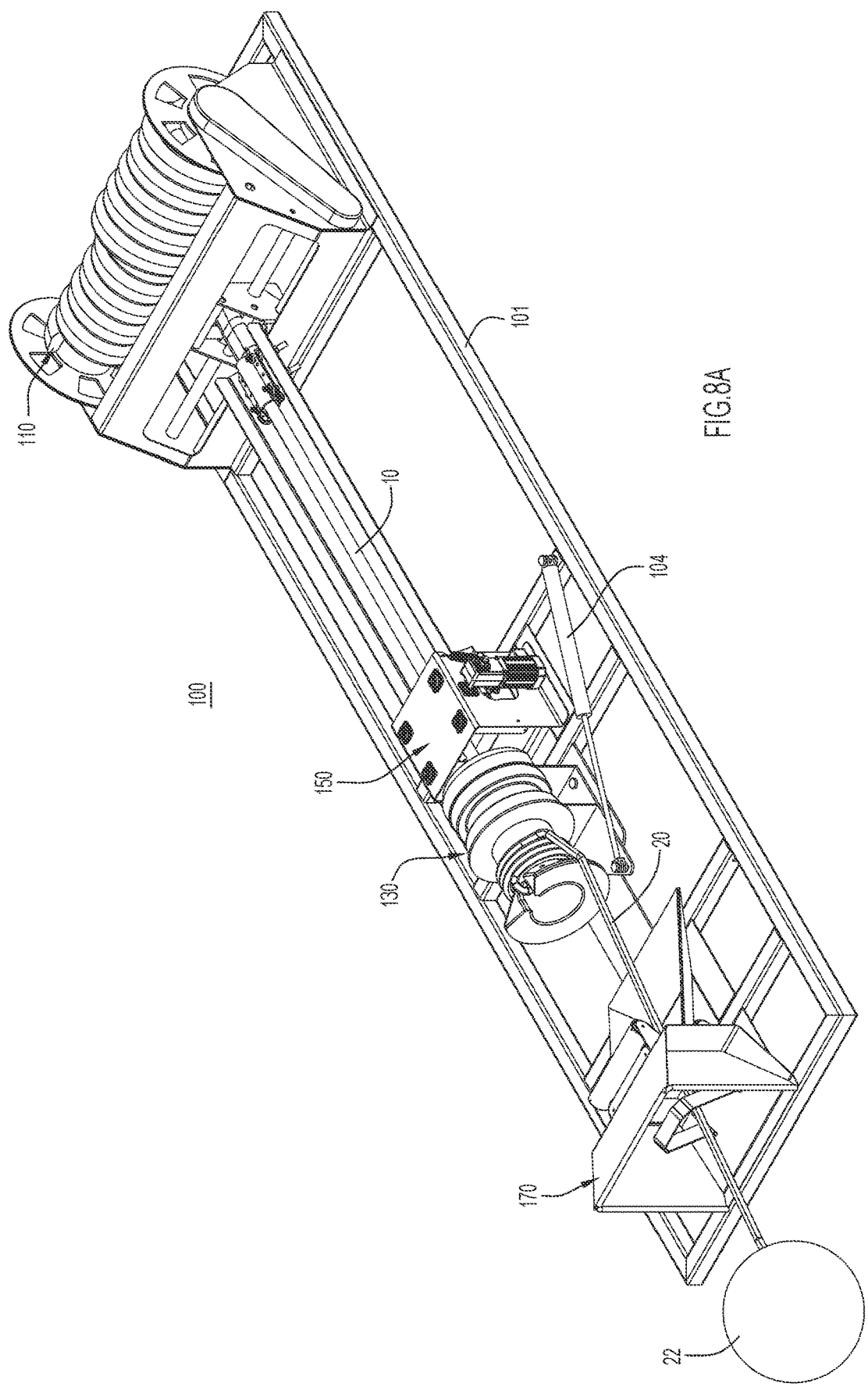
FIGS. 8A-C illustrate the fuel hose deployment and retrieval system of FIGS. 7A-C with the buoy and messenger line partially deployed.
Figure 8B:
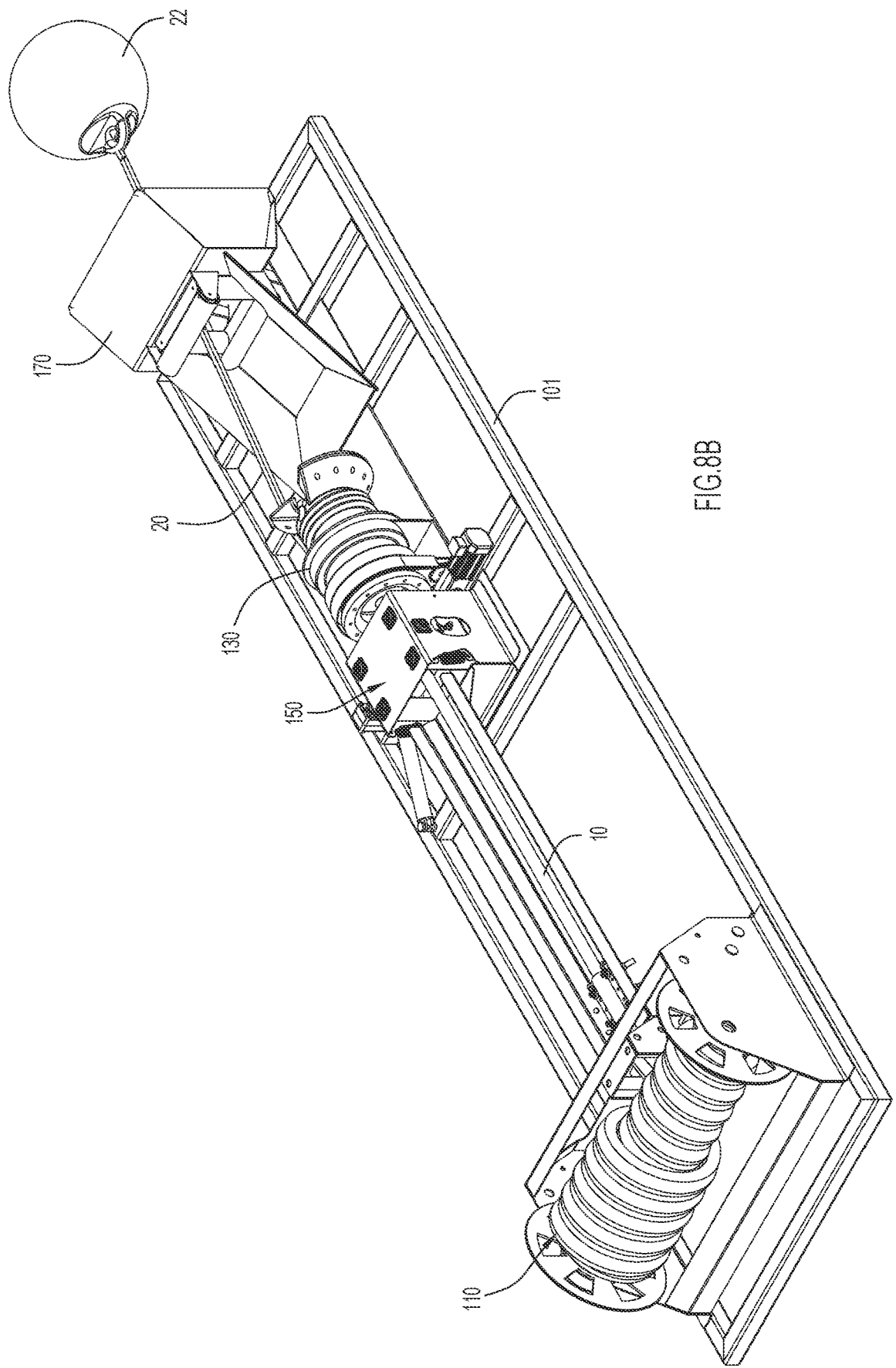
Figure 8C:
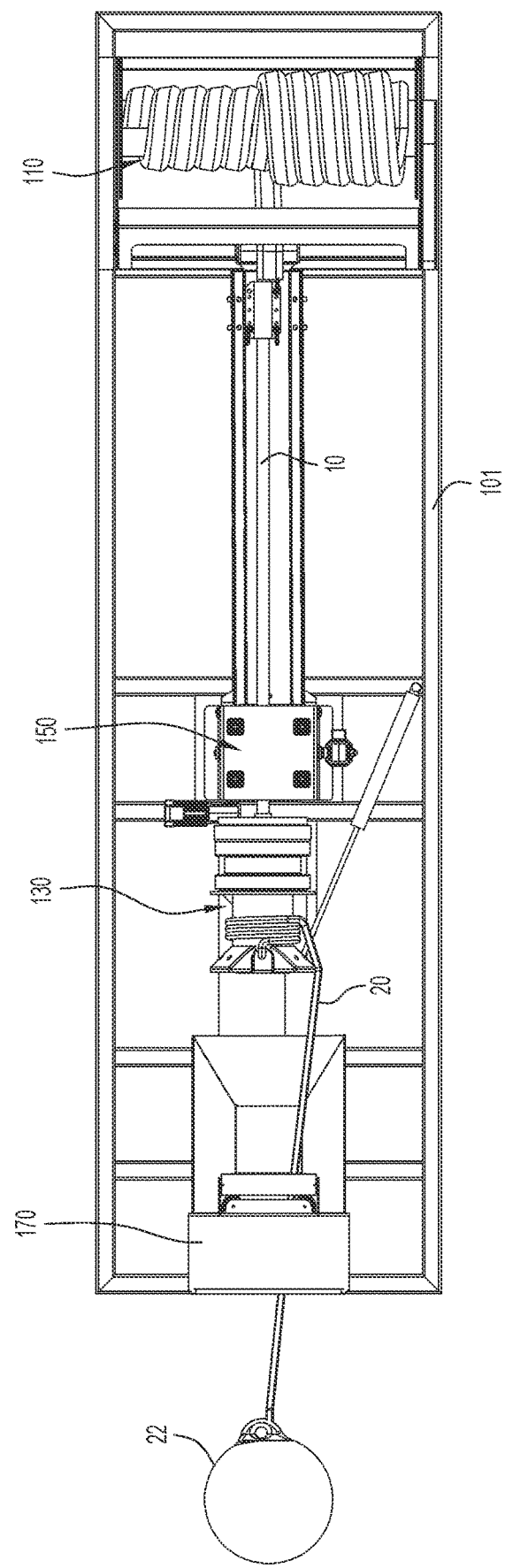

As noted above, according to one implementation the underway replenishment refueling operation begins by first launching the buoy 22 and the attached messenger line 20 into the sea using the second winch assembly 130. When the buoy 22 is launched, the eject arm 172 of the messenger line buoy chute 170 rotates from its first position to the second position as shown in FIG. 8A. Thereafter, the fuel hose assembly 10, which is attached to an end portion of the messenger line, is offloaded into the sea using the first winch assembly 110. As shown in FIGS. 8A-C, this process begins by rotating the second winch assembly 130, by use of the linear actuator 104, from its first rotational position to its second rotational position such that the rotational axis 131 of the drum is arranged substantially orthogonal to the rotational axis 171 of the first winch assembly. When this occurs, the messenger line 20, by weight of the buoy 22, begins to naturally unravel from the drum 131 along the rearward low friction release guide 138 until the buoy and messenger line are deployed into the sea aft of the USV.

Figure 9B:
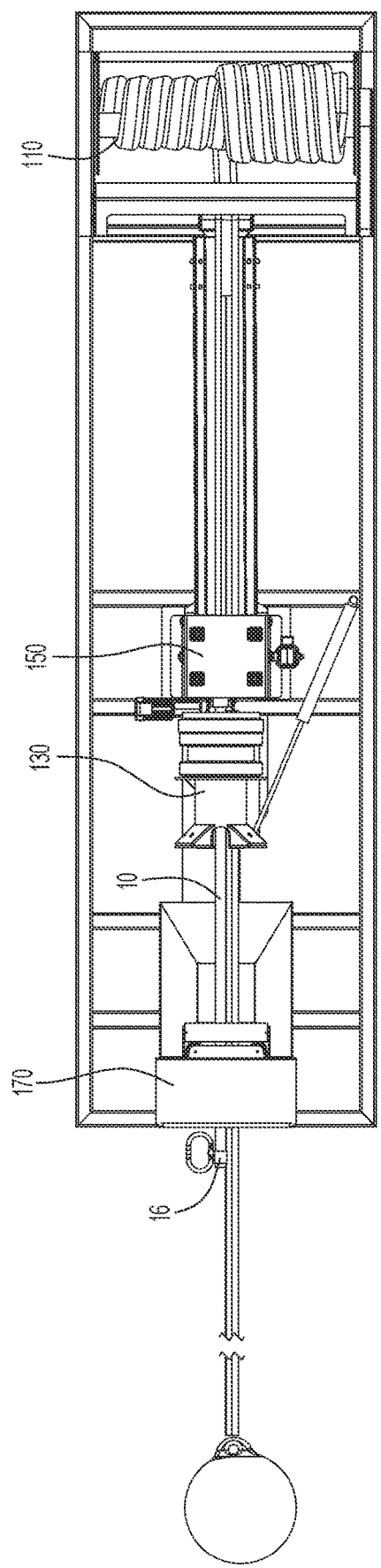

Upon the messenger line 20 being sufficiently deployed into the sea, rearward deployment of the fuel hose assembly 10 begins, as shown in FIGS. 9A-B, by activating the motors associated with each of the first winch 110 and guide roller assembly 150. With reference to FIG. 9A, the activation of the motor of the first winch 110 causes the drum of the first winch to rotate in a counter-clockwise direction so that an unwinding of the fuel hose assembly 10 occurs. The activation of the guide roller assembly motor 156 causes the driven upper horizontal roller 151a to rotate in a clockwise direction to assist in driving the fuel hose assembly 10 in the rearward direction and in a manner that holds the fuel line assembly taught on the drum of the first winch 110 during the unwinding process.

As the fuel hose assembly 10 is deployed, it advances rearward through the guide roller assembly 150, the inner through opening 142 of the second winch assembly 130 and the buoy chute 171. According to one implementation, the deployment continues until about 300 to 400 feet of the fuel hose assembly 10 resides in the sea in an area located between the USV and RV. Thereafter, the messenger line 20 and a distal end of the fuel hose assembly 10 are brought onboard the RV as explained above, and fuel is transferred from the RV to one or more fuel storage tanks located on the USV.

As explained above, when the transfer of fuel from the RV to the USV is complete, the fuel hose assembly 10 is disconnected from the RV and retrieved onboard the USV. This involves returning the messenger line 20 and fuel hose assembly 10 into the sea and then returning them to the USV using the first and second winches 110 and 130. During the retrieval process, the second winch 130 is initially maintained in its second rotational position with its rotational axis 131 being arranged substantially orthogonal to the rotational axis 111 of the first winch 110. With the first and second winches arranged as such, the first winch 110 is activated to spool the fuel hose assembly onto its drum with the fuel hose assembly 10 passing through the inner bore 142 of the second winch 130. The fuel hose assembly 10 is rewound onto the drum of the first winch 110 until the hose clamp 18 returns to its initial ready state position (see FIG. 7A) on the support tray 160. According to one implementation, the one or more position sensors 163 are configured to send a signal to a control unit that controls the motor of the first winch 110. As the hose clamp 188 assumes its initial ready state position the one or more position sensors 163 send a signal to the control unit. The control unit, in turn, cause the motor to cease rotation and to lock so that the drum of the first winch 110 is unable to rotate.

Figure 10A:
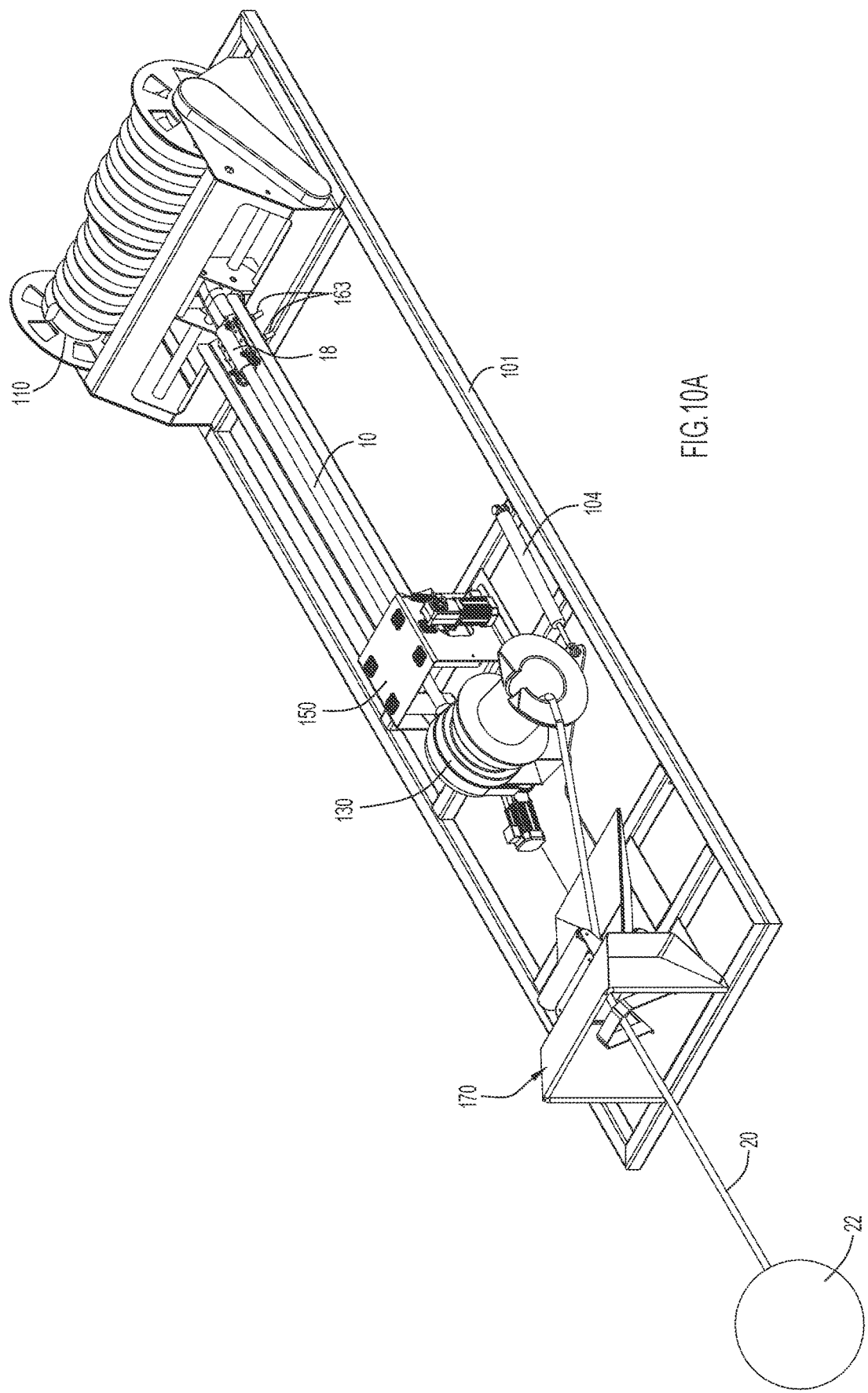
FIGS. 10A-C illustrate the fuel hose deployment and retrieval system of FIGS. 7A-C with the fuel hose assembly fully spooled on the drum of the fuel hose winch and the messenger line being ready to be retrieved on the drum of the messenger line winch.
Figure 10B:
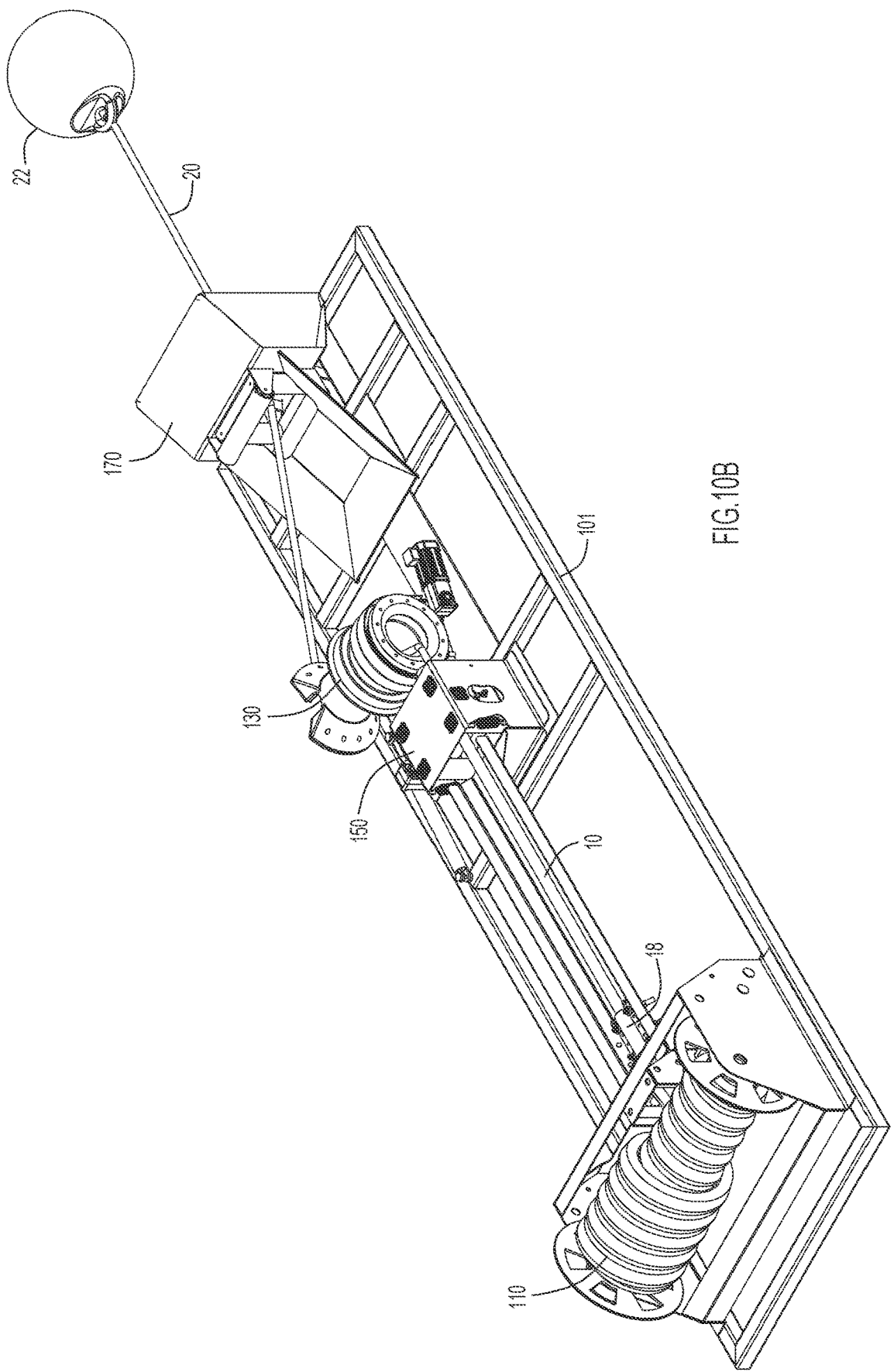
Figure 10C:
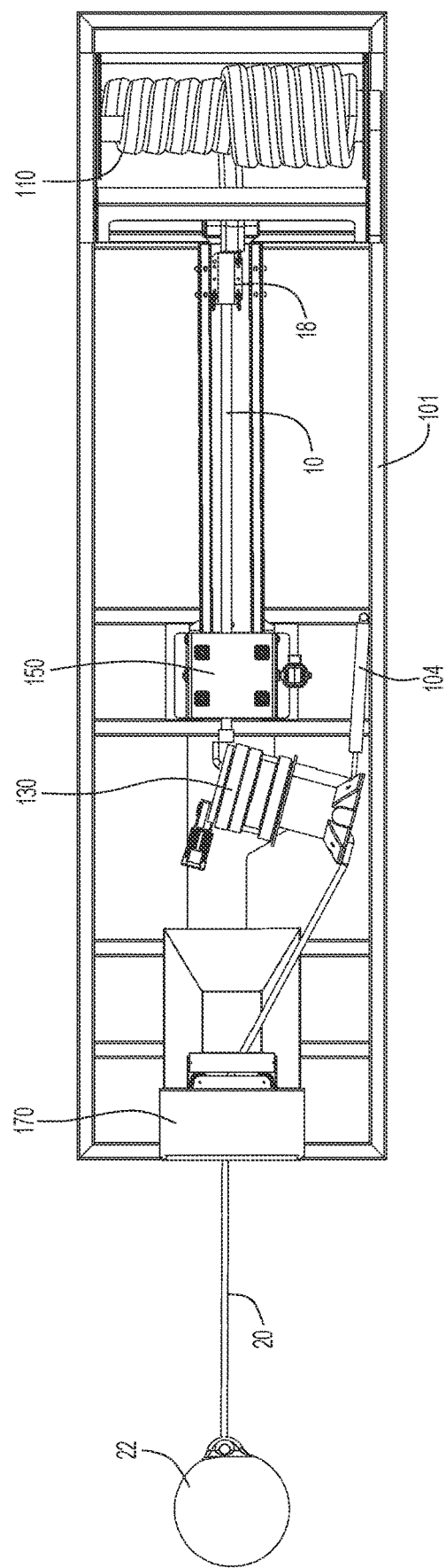

When the spooling of the fuel hose assembly 10 onto the drum of the first winch 110 is complete, thereafter, the second winch is pivoted on the frame 101, as shown in FIGS. 10A-C, so that the first rotational axis 131 of drum 132 is arranged non-orthogonal to the second rotational axis 111 of the second drum. Thereafter, the second winch 130 is activated to wind the messenger line 20 onto drum 132. The winding of the messenger line 20 back onto the drum 132 of the second winch 130 continues until the buoy 22 is once again parked inside the buoy chute 171. As the buoy enters the chute, it presses against the spring loaded eject arm 172, causing the eject arm to rotate forward to assume its first position. When this occurs, the one or more position sensors 173 send a signal to a control unit that controls the motor 135 (e.g. a gear reduction motor) of the second winch 130, the control signal being indicative of the buoy 22 being parked inside chute 171. According to one implementation, the control unit, in turn, cause the motor to cease rotation and to lock so that the drum 132 is unable to rotate. According to one implementation, this positioning of the first and second winches is maintained until a following offloading procedure is initiated.

What is claimed is:

1. A fuel hose assembly deployment and retrieval system configured to off-load and on-load a fuel hose and a messenger line coupled to a distal end portion of the fuel hose, the fuel hose assembly deployment and retrieval system comprising:
a first winch assembly including a first structure on which the fuel hose is configured to be spooled and unspooled, the first structure having a first rotational axis; and
a second winch assembly located rearward of the first winch assembly and including a second structure on which the messenger line is configured to be spooled and unspooled, the second structure having a second rotational axis and being rotatable between first and second rotational positions, upon the second structure being in the first rotational position the second rotational axis is non-orthogonal to the first rotational axis, in the second rotational position the second rotational axis is substantially orthogonal to the first rotational axis, the second structure including an axial through opening through which the fuel hose is configured to pass when the second structure is in the second rotational position.

2. The fuel hose assembly deployment and retrieval system according to claim 1, wherein when the second structure is in the first rotational position, the second rotational axis is non-orthogonal and non-parallel to the first rotational axis.

3. The fuel hose assembly deployment and retrieval system according to claim 1, wherein the first and second winch assemblies are attached to a common frame.

4. The fuel hose assembly deployment and retrieval system according to claim 1, wherein the second winch assembly is coupled to a frame, the second structure being rotatable between the first and second rotational positions by a linear actuator having a first end coupled to the frame and a second end coupled to a part of the second winch assembly.

5. The fuel hose assembly deployment and retrieval system according to claim 1, further comprising a pivot pin and a frame on which a base of the second winch assembly is supported, the pin extending into an opening in the base and an opening in the frame to prevent the second winch assembly from rotating.

6. The fuel hose assembly deployment and retrieval system according to claim 1, further comprising a messenger line buoy chute located rearward of the second winch assembly and through which the fuel hose and messenger line are configured to pass.

7. The fuel hose assembly deployment and retrieval system according to claim 1, further comprising a messenger line buoy chute assembly located rearward of the second winch assembly, the messenger line buoy assembly including a buoy chute through which the fuel hose and messenger line are configured to pass, the messenger line buoy assembly including a buoy eject arm that pivots between a first position and a second position, the system further comprising one or more position sensors that are configured to detect when the buoy eject arm is in the first position or in the second position, the one or more sensors being operatively coupled to a motor that rotationally drives the second structure of the second winch assembly.

8. The fuel hose assembly deployment and retrieval system according to claim 1, wherein the second structure is diametrically smaller than the first structure.

9. The fuel hose assembly deployment and retrieval system according to claim 8, wherein the first structure is coupled to and rotated by a first motor and the second structure is coupled to and rotated by a second motor, the second motor being smaller than the first motor in terms of both power and size.

10. The fuel hose assembly deployment and retrieval system according to claim 1, further comprising a messenger line buoy chute assembly located rearward of the second winch assembly and including first and second horizontal rollers arranged parallel to one another and between which the fuel hose and messenger line are configured to pass.

11. The fuel hose assembly deployment and retrieval system according to claim 10, wherein the messenger line buoy chute assembly includes a guide ramp located at an entrance of a buoy chute, the guide ramp being made of or coated with a material having a low coefficient of friction.

12. The fuel hose assembly deployment and retrieval system according to claim 1, further comprising a guide roller assembly positioned between the first and second winch assemblies, the guide roller assembly including first and second horizontal rollers arranged parallel to one another, the first horizontal roller being coupled to a motor that is configured to cause the first horizontal roller to rotate, an area between the first and second horizontal rollers being a designated pathway for the fuel hose to pass upon the fuel hose being spooled onto or spooled off the first structure.

13. The fuel hose assembly deployment and retrieval system according to claim 12, wherein the guide roller assembly is configured to hold the fuel hose taught upon the fuel hose being spooled off the first structure.

14. The fuel hose assembly deployment and retrieval system according to claim 12, wherein the second horizontal roller is continuously urged towards the first horizontal roller.

15. The fuel hose assembly deployment and retrieval system according to claim 12, further comprising a messenger line buoy chute located rearward of the second winch assembly and through which the fuel hose and messenger line are configured to pass.

16. The fuel hose assembly deployment and retrieval system according to claim 15, wherein the first winch assembly, guide roller assembly, second winch assembly and messenger line buoy chute are coupled to a common frame.

17. The fuel hose assembly deployment and retrieval system according to claim 16, wherein the frame has a length of 20 to 25 feet and a width of 5 to 7 feet.

18. The fuel hose assembly deployment and retrieval system according to claim 12, further comprising a longitudinal tray that extends between the first winch assembly and the guide roller assembly, the longitudinal tray being configured to support the fuel hose as the fuel hose is spooled off and onto the first structure of the first winch assembly.

19. The fuel hose assembly deployment and retrieval system according to claim 18, wherein the longitudinal tray includes a bottom surface that comprises or is coated with a material having a low coefficient of friction.

20. The fuel hose assembly deployment and retrieval system according to claim 18, wherein the longitudinal tray includes a bottom surface that comprises a nylon strip.

\* \* \* \* \*